United States Patent [19] [11] 3,690,552
Plump et al. [45] Sept. 12, 1972

[54] FOG DISPERSAL

[72] Inventors: Ralph E. Plump, Hartford, Vt.;
Robert M. Backiel, Richmond, Va.

[73] Assignee: The United States of America as represented by the Secretary of the Army

[22] Filed: March 9, 1971

[21] Appl. No.: 122,500

[52] U.S. Cl. ........................... 239/2 R, 239/14
[51] Int. Cl. .................................. A01g 15/00
[58] Field of Search ........................ 239/2 R, 14

[56] References Cited

UNITED STATES PATENTS 2,052,626  9/1936  Houghton, Jr. ............ 239/2 R

Primary Examiner—M. Henson Wood, Jr.
Assistant Examiner—Thomas C. Culp, Jr.
Attorney—Harry M. Saragovitz, Edward J. Kelly, Herbert Berl and Lawrence E. Labadini

[57] ABSTRACT

The destruction of a warm fog is accomplished by dispersing through the atmosphere a sufficient quantity of low moisture, cellulose fibrous structure, such as small absorbent paper section, which may contain a hygroscopic agent, said structures functioning to absorb moisture and to collect water droplets as they descend through the atmosphere at a speed of not more than 4.0 feet per second.

8 Claims, No Drawings

FOG DISPERSAL

BACKGROUND OF THE INVENTION

This invention relates to a method of dissipating fog from a designated area.

The disruptive effect of fog on transportation is magnified when the fog settles in areas of particularly high traffic density, such as busy airports, narrow approaches to busy harbors, major highway intersections, heavily trafficked bridges, etc. If these areas could be kept open, despite widespread fog conditions, traffic could continue to flow and the disruption would be held to a minimum. Attempts have been made to remove or dissipate fog from designated areas which vitally affect or control transportation services and some success has been achieved in the destruction or elimination of supercooled fogs. It should be noted that supercooled fogs consist of a dispersion of droplets of water, which droplets exist at temperatures below the freezing point of water. The distribution of iodide or dry ice crystals through a supercooled fog provides nuclei which allow the droplets to freeze and precipitate out of the atmosphere. Liquid propane is another agent used with some success and when sprayed into such a fog cools the droplets to a point where they can no longer exist as liquids but are converted to ice crystals. Warm fog, i.e., a dispersion or suspension of tiny water droplets having a temperature above the freezing point of water, is, however, a more troublesome phenomenon and one which does not lend itself to nucleation and precipitation as does a supercooled fog. A warm fog is an extremely stable suspension having little or no tendency to coalesce and fall under the influence of gravity. Since the relative humidity of the air in which the warm fog suspension exists is at or near 100 percent, evaporation of the droplets is virtually impossible. Warming the air would lower the relative humidity but the quantity of heat that would have to be applied for this purpose would be totally impractical. Mechanical devices have also been employed to virtually sweep water droplets from the air but the area covered by such devices is too small to be of any significant value. It is among the objects of the present invention to provide a method for removing warm fog from localized areas.

SUMMARY

Control or destruction of warm fog is accomplished according to this invention by dispersing through said fog an effective quantity of a material that functions both to absorb moisture and to collect water droplets from the atmosphere. The materials employed are cellulose fibrous structures having a low density, a low weight to volume ratio, a low moisture content and the ability to both absorb a substantial amount of moisture and collect water droplets. The materials may, in addition, have impregnated on their surfaces a quantity of a hygroscopic material to promote a more rapid absorption of moisture. The low weight to volume ratio permits the material to drift slowly through the fog laden atmosphere collecting water droplets on its downward descent.

DESCRIPTION OF THE PREFERRED EMBODIMENT

The destruction or clearing of warm fog from a given area is accomplished according to the present invention by dispersing within said area an effective quantity of cellulose fibrous structures which structures function to absorb moisture from the adjacent atmosphere and to collect water droplets with which they may come in contact. Preferably, the cellulose fibrous structures are dispersed at or near the top of the area to be cleared allowing the structures to fall slowly through space to the ground under the influence of gravity, collecting water droplets on their downward flight.

The cellulose fibrous structures useful in this invention have a density, apparent or real, below 1.5. In addition, the cellulose fibrous structures are in substantially anhydrous condition, i.e., the moisture content of said structures is less than 0.5 percent by weight based on the weight of said structures. Such low moisture levels can be achieved by storage in low moisture environments or preferably by heating to remove moisture and subsequent storage in water-vapor proof containers. Heating at 110° C. to a constant weight is sufficient to produce cellulose structures having the required low moisture content. It is also necessary that the cellulose structures have a physical shape and form that will provide, aerodynamically, a retarded descent to the ground. Excellent collection efficiency can be achieved if the rate of descent is within the range of from about 1.5 feet per second to about 4.0 feet per second.

There are many types of cellulose fibrous structures which will meet the foregoing requirements, for example, tufts of cotton, chopped natural cellulose fibers, such as cotton or sisal and small pieces of paper would all be suitable. Cotton tufts slowly drift through the atmosphere and because of the large volume of action is an effective collector of water droplets without undergoing any change in form. Chopped cellulose fibers can be produced by chopping a cellulose rope into small pieces with available rope chopping equipment. Perhaps the best of the fibrous structures for most applications is paper which has been cut into small pieces of varying shapes. The paper should be absorbent, porous, unsized and should not be treated in any manner or have any additives or finishes that would reduce its capacity to absorb moisture. Paper toweling, filter paper, tissue paper, paper used for printing news are some of the more common types normally considered to be absorbent paper and are useful for the purposes of this invention. To be efficient in removal of fog, the pieces of paper should be small and no surface area greater than one square inch. Such small pieces of paper will on their downward flight rotate along their longest axis. Such rotation increases the volume of air that is exposed to the surfaces of the paper structures and also decreases the rate of descent of such structures, thereby increasing the collection efficiency of the paper for moisture and droplets in the atmosphere. The paper may be cut into any shape desired, both regular and irregular. One shape which has been found to be desirable because it not only rotates but descends in a downward spiral is a trapezoid with one end concave, and the other convex.

In those instance where it is desired to increase the initial rate of water absorption of the cellulose fibrous structures, the structures may be treated with minor quantities of hygroscopic agents. Such agents, as starters and promoters, will increase the initial rate of absorption but will not significantly increase the total amount of moisture collected by the structure. Hygroscopic agents are well known and include, as examples, such materials as sodium chloride, calcium chloride, urea, zinc chloride and formamide. Urea is a preferred agent because of its lower density (1.335) as compared with inorganic salts (2.15) and because the organic compound supplies nitrogen for bacterial decomposition, thereby promoting the biodegradability of the cellulose structures. Urea is a non-electrolyte, is relatively non-corrosive and its toxicity is negligible. The hygroscopic agents are added to the cellulose fibrous structures in an amount ranging from 5 to 20 percent by weight based on the weight of the structure. If such agents are added in aqueous solutions then, of course, the moisture is removed to provide a structure with a moisture content of less than 0.5 percent by weight.

In a series of experiments demonstrating the effectiveness of this invention, a warm fog was created in a transparent cloud chamber which was 6 feet in length and had a total volume of 12 cubic feet. The density or opacity of the fog was determined with a sensitive photocell transmissometer, calibrated with standard attenuation filters in the light beam of the transmissometer to determine the photocell response in terms of actual visibility. Heavy fog was produced in the cloud chamber by injecting steam from a pressure kettle at 250° F. until the temperature in the kettle fell to 240° F. This produced sufficient fog and insured that condensation on the walls of the chamber would be constant from one experiment to another. The temperature initially within the chamber and maintained constantly outside of the chamber is 45° F. Once the steam is within the chamber, the whole system is allowed a period of from 1 to 5 minutes to settle until an orderly attenuation pattern is shown by the transmissometer.

EXAMPLE I

In this example, the time for the fog to dissipate unaided in the chamber, i.e., to reach a transmissometer reading of 10 (no fog visible along the 6 foot length of the cloud chamber averaged 13 minutes and 52 seconds. By contrast, an 80 gm. piece of cellulose absorbent paper when inserted within the cloud chamber cleared the fog to a reading of 10 in 5 minutes. The addition of 10 % Na Cl on the 80 gm. piece of absorbent paper gave a more rapid absorption of the moisture in that a reading of 10 was obtained in 4 minutes.

EXAMPLE II

Because a significant effect from the standpoint of fog destruction are the results that take place within several minutes of the introduction of the cellulose fibrous structures into the atmosphere and during which such structure fall to the ground, this example determined the changes that occur over a relatively short interval of time. The starting point 47 each experiment is an actual opacity or obscurity of 47 in the cloud chamber as determined with standard attenuation filters. In the control experiment, after a two minute interval, the opacity went from 47 to about 10 which is approximately a four-fold reduction in opacity. In striking contrast to the natural fog decay noted above, the introduction into the top of the cloud chamber of 9.6 gm. of diamond shaped pieces of brown paper toweling (approximately 1-inch along its long axis and one-half inch on its short axis), having a moisture content of less than 0.5 percent by weight, in 1 minute produced an opacity of about 4.5. Expressed differently, the introduction of this quantity of paper in half the time interval of the control improved the light transmission by a factor of more than 2 as compared with the control.

EXAMPLE III

In this example, 11.2 gms. of oven-dried paper squares, prepared from brown paper toweling and one-fourth inch on each side, impregnated with 20 percent by weight of urea, was introduced into the top of the cloud chamber and in one minute the opacity of the chamber fell from 47 to 6 which is a significant improvement over the control, in half the time.

Other experiments were conducted with round, square, rectangular and trapezoidal pieces of paper. The shape does not appear to be critical although the trapezoidal shape with concave-convex ends will spiral down as it rotates which will lengthen its residence time in the atmosphere. It is clear that the addition of the hygroscopic agents to the cellulose fibrous structures increases the rate of moisture absorption over untreated structures. No great difference is found for purposes of this invention in the activity of the agents.

Residence time in the atmosphere is, of course, important in that a long residence time will allow the structures a greater opportunity to collect more water droplets. Therefore, small sized structures, those that will spin and descend slowly are desired. Thin paper will normally, therefore, be preferred to thick, heavier papers. Structures that will spin or revolve are preferred since they have a greater volume of action.

The cellulose fibrous structures may be dispersed by airplane, helicopter, rocket or any other means of delivery that will place the structures in the desired location.

The amount of the dried cellulose fibrous structures necessary to remove warm fog will vary with the amount of moisture present in the atmosphere. An average natural warm fog contains about 0.5 gm. of liquid water per cubic meter. To absorb this amount of moisture might take as much as 1.5 gm. of cellulose structures whether or not impregnated with hygroscopic agents. However, the physical shape or form of the structure is such that even after moisture has been absorbed to its capacity, the structure can still collect water droplets as it descends to the ground. Therefore, as little as 0.5 gm. of cellulose structures of the type described herein, therefore, may be sufficient to clear a cubic meter of fog.

The invention described in detail in the foregoing specification is susceptible to changes and modifications as may occur to persons skilled in the art without departing from the principle and spirit thereof. The term used is for purposes of description and not limitation, the scope of the invention being defined in the claims.

We claim:

1. A method of clearing a warm fog from an area which comprises dispersing an effective quantity of cellulose fibrous structures, having a density below 1.5 and an initial moisture content of less than 0.5 percent by weight, throughout said area whereby said cellulose structure absorb moisture from said area and collect fog droplets as they fall through said area under the influence of gravity, said cellulosic structures fall through the atmosphere at a rate of from 1.5 feet per second to 4.0 feet per second.

2. A method according to claim 1, wherein said cellulose fibrous structures are distributed in the upper part of said area to be cleared of fog and allowed to descend downwardly through said area.

3. A method according to claim 1, wherein said cellulose fibrous structures contain from 5 to 20 percent by weight of dry hygroscopic material.

4. A method according to claim 3, wherein said hygroscopic materials are selected from the group consisting of sodium chloride, calcium chloride, urea, zinc chloride and formamide.

5. A method according to claim 1, wherein said cellulose fibrous structures are selected from the group of structures consisting of paper pieces, chopped fibers, and loosely connected tufts of fibers.

6. A method according to claim 5 wherein said cellulose fibrous structures are unsized pieces of paper having no surface area greater than 1 square inch.

7. A method according to claim 6, wherein said paper pieces contain from 5% to 20% by weight of dry hygroscopic materials.

8. A method according to claim 3, wherein 0.5 gm. of said cellulose fibrous structures are dispersed in each cubic meter of atmosphere to be cleared of warm fog.

* * * * *